United States Patent [19]

Bloom et al.

[11] Patent Number: 4,570,110

[45] Date of Patent: Feb. 11, 1986

[54] PROGRAMMABLE SERVO MOTOR SPEED CONTROL APPARATUS

[75] Inventors: Robert D. Bloom, Montrose, Pa.; John V. Gac, Newark Valley, N.Y.; Eugene T. Kozol, deceased, late of Binghamton, N.Y., by Eleanor Kozol, executrix

[73] Assignee: International Business Machines Corporation, Armonk, N.Y.

[21] Appl. No.: 645,388

[22] Filed: Aug. 29, 1984

[51] Int. Cl.[4] .............................................. H02P 5/16
[52] U.S. Cl. .................................... 318/313; 318/318; 318/312; 318/314
[58] Field of Search ............... 318/313, 306, 308, 310, 318/311, 312, 317, 318, 315, 316, 326, 327, 329, 333, 341, 345 A, 345 E, 398, 400, 443, 444, 445, 449, 484

[56] References Cited

U.S. PATENT DOCUMENTS

| | | | |
|---|---|---|---|
| 3,331,006 | 7/1967 | Strand et al. | 318/314 |
| 3,349,308 | 10/1967 | Strand | 318/314 |
| 3,594,563 | 7/1971 | Bishop | 318/443 X |
| 3,646,417 | 2/1972 | Cassie et al. | 318/318 |
| 3,950,682 | 4/1976 | Dohanich, Jr. | 318/327 X |
| 3,953,776 | 4/1976 | Wolf | 318/312 |
| 4,066,941 | 1/1978 | Foster | 318/341 |
| 4,152,631 | 5/1979 | Weinberg et al. | 318/341 X |
| 4,427,933 | 1/1984 | Wagener et al. | 318/345 E X |
| 4,472,667 | 9/1984 | Koos, Jr. | 318/326 |

Primary Examiner—William M. Shoop, Jr.
Assistant Examiner—Shik Luen Paul Ip
Attorney, Agent, or Firm—John S. Gasper

[57] ABSTRACT

Servo control circuit for a DC motor having programmable timers to control the motor energizing period independently for each unit of shaft displacement. The circuit includes timer-gated latches to signal below-speed and above speed conditions and override the timer control period to reestablish the desired velocity.

16 Claims, 4 Drawing Figures

PROGRAMMABLE SERVO MOTOR SPEED CONTROL APPARATUS

BACKGROUND OF THE INVENTION

This invention relates generally to servo speed control circuits for direct current motors and, more particularly, to a circuit for independently correcting motor velocity at each unit of displacement.

Precise displacement control of DC motors for short moves is extremely difficult when encountering varying loads during drive periods. An example of such loading is that encountered in driving printer carriages to incrementally advance forms, particularly multi-part fan folded forms, through the print station. The distance paper is to be advanced is not uniform and the form weight or folds change the frictional drag on the drive motors. As a consequence, accurate positioning has not been easy to attain.

The usual current control circuit uses displacement feedback signals generated from the motor shaft or driven load to indicate the attainment of a unit of motion. Actual signal frequency is compared with that of a desired frequency and corrective changes in drive current are applied to the motor. Changes can be made in the current level or the width of applied pulses can be modulated to attain the required velocity. These circuits work well in situations where the motor is continuously driving a load because the velocity changes usually occur and are corrected gradually over several signal periods.

One example of such a circuit is that described in U.S. Pat. No. 4,259,698 in which a continuously running motor is controlled through a phase locked loop having a voltage controlled oscillator whose output is divided by the control factor that varies according to the motor velocity. With this type of circuit the phase lock loop tends to act like a filter and several displacement signals are required to produce an effective velocity change since the change occurs gradually. Another example is the circuit shown in U.S. Pat. No. 4,371,819 in which a mircroprocessor senses displacement signals to determine the time between consecutive signals and averages the time over a predetermined number of signals. The results are used to alter the duty cycle of the motor energization. Again, the correction is slow. Another example is shown in U.S. Pat. No. 4,400,654 in which the displacement signal is taken from a motor shaft once each revolution and used to calculate a corrective duty cycle for each of the energization periods of the multi-winding motor in the following revolution. The foregoing examples all use pulse width modulation as a control for the motors.

When a DC motor is used for incremental movement of a load, there is little time available for making corrections over several shaft displacement units or emitter periods. Some moves will approximate only a small fraction of a revolution of the motor shaft, including the acceleration and deceleration phases. A corrective change in those situations is necessary as soon as the deviation from the desired velocity is sensed. This requires that correction be made for the interval between successive emitter pulses. If a microprocessor is to be used to control stopping, for example, the velocity at which the stop phase begins must be assured.

Microprocessors are also often used to control the application of motor current. With high speed, incremental positioning applications there are occasions which the microprocessors cannot stay current with the demand for monitored control because it cannot service the interrupts at the frequency with which they occur. In these situations the microprocessor must be dedicated to a single task, thus making the control circuit prohibitively expensive.

OBJECTS AND SUMMARY OF THE INVENTION

It is accordingly a primary object of this invention to provide a servo control method for a DC motor that initiates corrective action in response to each single measured displacement interval during any period of desired constant velocity.

Yet another important object of this invention is to provide a servo control method that maintains motor velocity within a narrow range regardless of the period of desired constant velocity.

Another object of this invention is to provide motor velocity control apparatus that is programmable by a microprocessor as to different desired velocities but which effects actual control independently of the microprocessor.

A still further object of this invention is to provide servo control apparatus for a DC motor that is simple and efficient to incorporate in a microprocessor system and offers close, accurate control of the motor.

The foregoing and other objects of the invention are attained in accordance with the invention by providing first and second programmable timer means that are both triggered by each displacement signal to time a desired period between successive displacement signals and a delay period before energizing the motor with its drive pulse. The two timed periods differ by an amount empirically determined as the width of an energizing pulse to maintain the desired motor velocity. As the motor velocity deviates from the desired set time period between displacement signals, underspeed and overspeed latches respond to the variations appropriately by either extending the duration of the motor energization or blocking further energization until velocity has decreased to an acceptable level.

The use of programmable timing means permits the servo circuit to be easily altered to apply the energizing current for a sufficient time to achieve any of several selected velocities. Thereafter, the microprocessor can let the servo circuit operate independently and velocity is assured within the tolerance range of the motor period. This arrangement enables the microprocessor to be used only for the acceleration and deceleration phases while being free to do other tasks during the period of constant motor velocity. The pulse width modulation of the motor energization enables application of the full motor current and resulting torque to reestablish the desired velocity to a slowed motor. By making the control circuit responsive to each displacement signal, there is achieved a faster corrective reaction to the motor velocity deviation.

The foregoing and other objects features and advantages of the invention will be apparent from the more particular description of a preferred embodiment of the invention, as illustrated in the accompanying drawing.

DESCRIPTION OF THE PREFERRED EMBODIMENT

Figure 1:
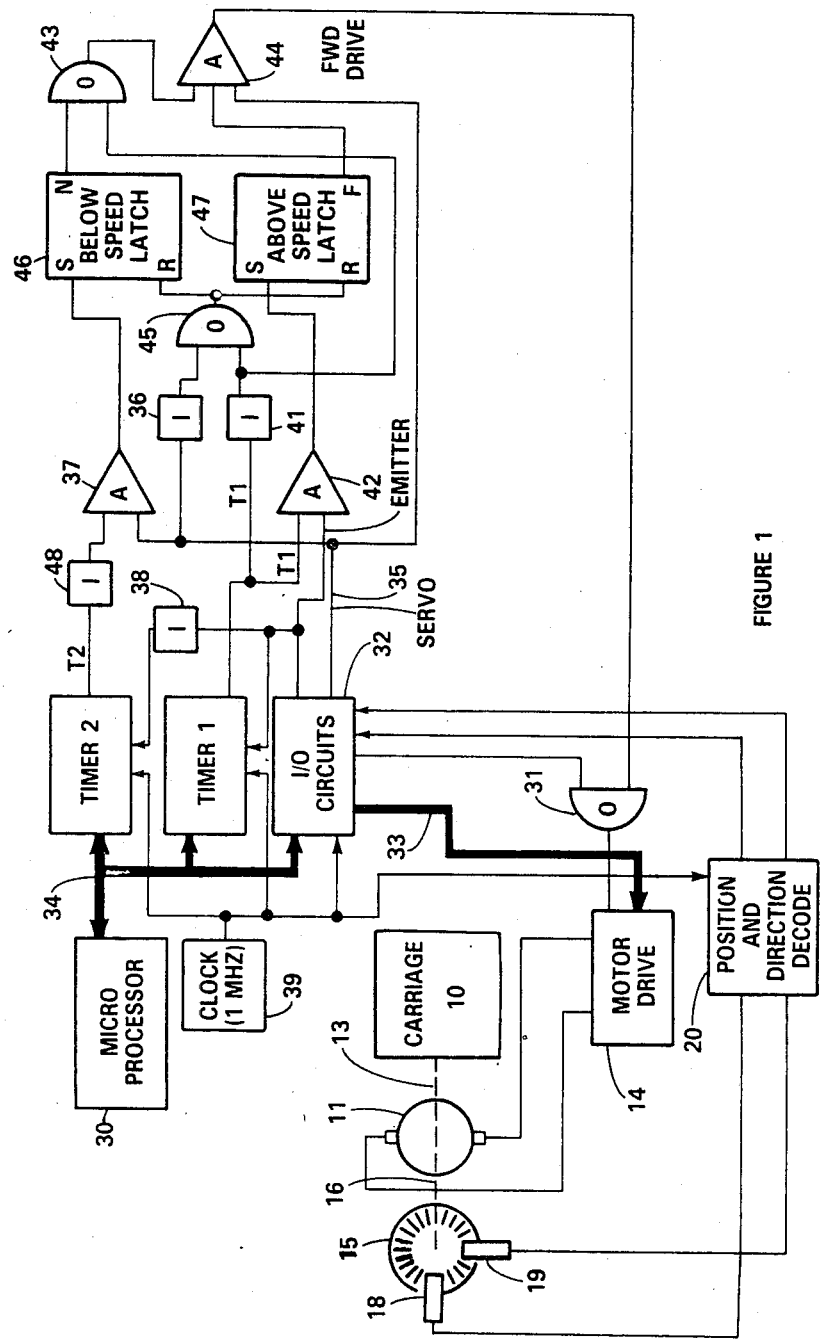
FIG. 1 is a circuit diagram of a motor control circuit incorporating a velocity servo circuit constructed in accordance with the principles of the invention.

Referring to FIG. 1, there is schematically illlustrated forms feed apparatus for a printer comprising a carriage 10 through which paper, not shown, is fed and which is driven by a direct current motor 11. Carriage assembly 10 may be a mechanical assembly including one or more paper feed devices such as paper feed tractors on a drive shaft rotatably supported on the carriage frame. Motor 11 is connected by suitable gearing or pulleys to the drive shaft 13, indicated by broken lines, in a well known manner. Motor 11 is preferably a high speed, low inertia permanent magnet DC servo motor connected to be energized by a motor drive circuit 14. The drive circuit can be any suitable circuit such as an H-drive that is a well-known bridge network comprising power transistors which are switched to connect motor 11 to a power source to obtain operation.

Motor 11 effects the line spacing of paper in carriage 10. The spacing may require an increment of motion equivalent to a single line or a plurality of lines. It is desirable that the motor reaches a known velocity and be maintained at that velocity between the acceleration period and deceleration period, which are both under the control of a microprocessor. When energized, the motion of the motor is monitored by an optical encoder disk 15 secured to motor shaft 16. Disk 15 may be constructed of an opaque material having transparent slits uniformally spaced and arranged in a single circular track. In a preferred embodiment, the angular spacing is one degree, thus requiring a track of 360 slits. The motion of disk 15 is sensed by transducers 18 and 19 that sense light transmitted through the slits by a light source, not shown, and generate binary motion signals designated A emitter and B emitter. The transducers are angularly spaced with respect to the slits so that motion signals A emitter and B emitter are generated in phase quadrature. The emitter signals are applied to a position and direction decode circuit 20 that shapes the signals into square wave binary signals having leading and trailing edges which are 90 electrical or one-quarter mechanical degrees out of phase with each other. The span from the leading edge of signal A or B to the next leading edge thereof represents one degree of rotary disk motion. The A and B pulses can be used to determine direction by noting the sequence of occurrence of the leading edges of the pulses and to produce displacement signals by using the leading and trailing edges thereof. Position and direction decoding circuit 20 can be one of several well-known in the art.

During operation, motor 11 may be considered as having three typical phases of acceleration, constant velocity, and deceleration or stopping each time the carriage assembly is to moved. A microprocessor 30 is used to control the acceleration and deceleration phases but it places the constant velocity phase under control of the servo circuit of the invention. The microprocessor, however, sets timer values in the servo circuit to select the desired velocity as will be described below. Maintenance of constant motor velocity is important since, during the stopping phase, the microprocessor assumes a particular motor velocity from which to decelerate.

Upon receipt of a Carriage Go command, microprocessor 30 applies a drive signal through OR gate 31 to motor driver 14. Motor driver 14 usually includes a digital-to-analogue converter that can set the magnitude of the drive current in response to digital signals from Input-Output circuits 32 on I/O bus 33. The current is established by the microprocessor on address and data bus 34. For example, the motor current for initiating movement may be approximately thirty amperes. After the motor shaft has rotated some distance for example, two degrss, the microprocessor is interrupted by I-O circuits 32 to check whether the motor has failed to move. Assuming motion occurred, microprocessor 30 then activates the servo circuit of the invention.

To initiate servo operation, microprocessor 30 sets digital values in Timer 1 and Timer 2 via bus 34 and activates the servo line 35 from I-O circuits 32 to inverter 36, and conditions AND gates 37 and 44. The output of inverter 36, in the absence of a servo signal provides a continuous reset signal to below speed and above speed latches 46 and 47. The microprocessor also decreases the motor amperage through I-O circuits 32 to the digital-to-analogue converter at motor driver 14 to an intermediate level, such as twenty amperes. The servo circuit is in operation during the latter portion of acceleration, but ineffectual until the selected constant velocity is reached since the servo circuit calls for continuous drive because of the motor underspeed. A determination of the actual motor velocity is made by a timer in I-O circuits 32 measuring the time between successive one degree emitter pulses, such as the A pulses. When the desired speed is reached, an interrupt occurs to microprocessor 30 which responds by decreasing the current level to that required for constant velocity, such as five amperes.

Figure 2:
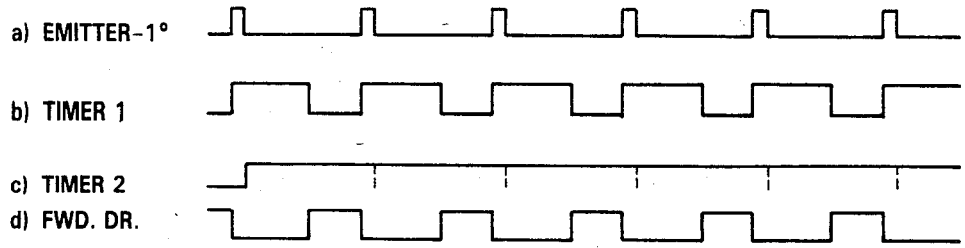
FIGS. 2, 3 and 4 are timing diagrams illustrating operation of the circuit of FIG. 1 under conditions of correct motor velocity, under velocity and over velocity, respectively.

During the acceleration portion of the velocity profile, Timer 1 and Timer 2 are set by an emitter pulse issuing from I-O circuits 32. Emitter pulses from a single transducer 18 or 19 are used as the emitter pulses. Timer 1 is set from the leading edge of the same emitter pulse as seen in the wave forms in FIGS. 2a and 2b. Timer 2 is set from the trailing edge of each emitter pulse through inverter 38 as seen in FIG. 2c. Timers 1 and 2 are set to a selected count and thereafter decremented by pulses from clock circuit 39. The timers are programmable by microprocessor 30 and are retriggerable. That is they can be preset to the original value before reaching 0 if an emitter pulse occurs. An example of a suitable programmable timer is Model 6840 from Motorola Corporation.

Timer 2 is set with a selected value equal to the desired time between successive emitter pulses. For example, at a carriage speed of 50 inches per second, the value placed in Timer 2 during each reset is 166 usec. Timer 1, however, is set to time out a few microseconds earlier than that of timer 2. The difference in time between the two timers serves as an energization signal to motor driver 14. This is illustrated in FIG. 2d. In the example of paper speed of 50 inches per second, Timer 1 may be set at 162 usec., thus leaving a difference of 4 microseconds between its value and that of Timer 2 as the duration of the drive signal.

Both Timer 1 and Timer 2 are decremented by clock 39 which is operating, for example, at a frequency of one magahertz. Timer 1 will time out before Timer 2 and provide an output signal that serves as an input to inverter 41 and AND gate 42. When the output level of Timer 1 drops at the conclusion of its measured period, 162 usec. in this instance, the output of inverter 41 is effective through OR gate 43 and AND gate 44 to provide a forward drive signal through OR 31 to motor driver 14. The output signal from inverter 41 is also effective through OR gate 45 as a reset signal for both Below Speed latch 46 and Above Speed latch 47. The forward drive signal resulting from the output level of Timer 1 continues until Timer 1 is reset by the next emitter signal. If the velocity is correct, Timer 2 will be reset just as it times out as indicated in FIG. 2c by dotted lines. The difference between the values to be set in Timers 1 and 2 by the microprocessor is determined empirically through operation of the motor.

Figure 3:
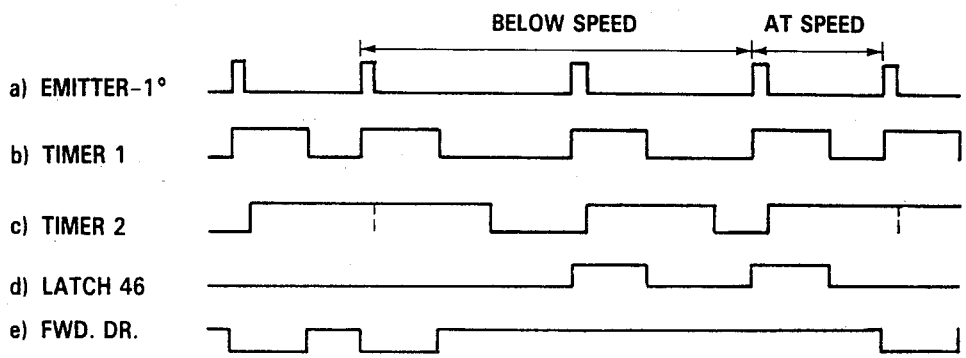

Motor 11 of FIG. 1 may experience changes in the loading due to form folds or form thickness which would slow the motor, or experience the sudden reduction in loading as a fold clears the platen. Accordingly, the servo circuit must correct for these changes in loading that directly affect the motor velocity. In the case of an increase in load on the motor, Timer 1 will time out and initiate a forward drive signal as described above. Timer 2 will also time out and this condition will not affect the forward drive signal. (Note wave forms b and c in FIG. 3). However, if nothing further were done, the next emitter pulse would reset Timer 1 and Timer 2 to terminate the drive pulse for the period of Timer 1. To prevent termination of the forward drive signal, the drop in signal levels from Timer 2 at the expiration of its time is effective through inverter 48 and conditioned AND circuit 37 to set Below Speed latch 46. The reset signal will have been removed from latch 46 by the rising input to inverter 41 from Timer T1 as it is reset by the emitter signal. The output of Below Speed latch 46 is effective through gates 43, 44 and 31 to continue the motor drive signal at motor driver 14. The relationship of signals from latch 46 and the forward drive signal is shown in the wave forms of FIGS. 3d and 3e. It will be noted that the forward drive signal is not interrupted between the reset of Timer 1 and setting of latch 46 since both signals are effective in succession through gate 43.

Figure 4:
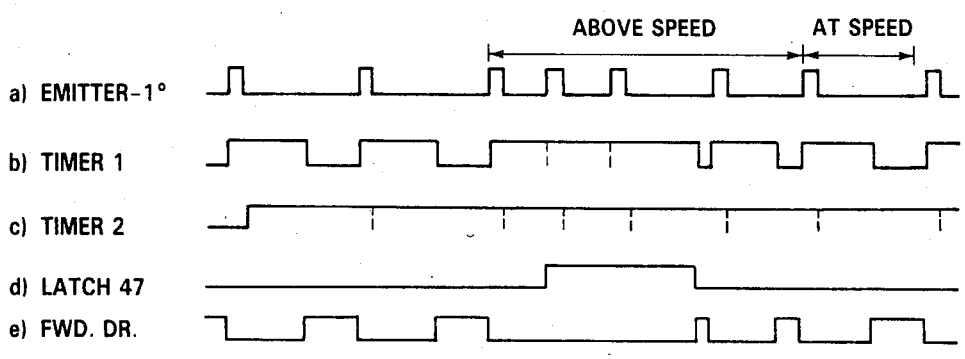

The condition of excessive motor velocity is illustrated with respect to wave forms in FIG. 4. When the motor is operating at a velocity that is above that desired, the emitter signals will be closer together in time, as in FIG. 4a. This condition produces the resetting of both Timers 1 and 2 before they can time out. Timer 1 will be unable to time out and thus cannot apply a drive signal through inverter 41 OR gate 43. To assure that no drive current is added to the motor, Above Speed latch 47 is set on. Since the Timer 1 output is high at inverter 41, the reset level at OR gate 45 is removed and the Timer 1 output and emitter pulses are thus effective at AND gate 42 to set latch 47 at wave form d in FIG. 4. When latch 47 is turned on the conditioning level is removed from AND gate 44 blocking forward drive signals. As soon as the motor slows sufficiently, Timer 1 can time out, the Above Speed latch 47 is reset to thereby enable gate 44 and any forward drive signal due to Timer 1 being off will provide a drive current to the motor as in FIG. 4e.

The foregoing servo circuit uses the actual time between successive emitter pulses to control the motor velocity and does not require an averaging of a plurality of emitter periods. The microprocessor resumes control of the motor when stopping is to occur. The servo signal is terminated from I/O curcuits 32 and the microprocessor begins a stepped deceleration of the motor by applying reverse current from driver 14 at different values. In the stopping process, variations in motor velocity at the initiation of a stop can produce differences in stopping time and thus, errors in final motor positions. By maintaining close control over the motor speed, its velocity can be kept within a narrow tolerance range such as plus or minus three percent. The deceleration or stopping phase of the motor can be better handled by the microprocessor since the velocity at which stopping takes place is reliably known. Because of this circuit, conventional DC motors, as opposed to step motors, can be more widely used for accurate incremental positioning.

The incorporation of programmable, retriggerable timers provides an efficient and accurate control. It is easy for the microprocessor to write different values into the timers to adapt to changes in operating conditions. For example, if the paper speed of carriage 10 in FIG. 1 is to be altered, the time periods for Timers 1 and 2 can be stored as different from those values used for illustration. The value for Timer 2 dictates the motor velocity and that of Timer 1 can be operated at approximately the same differential pulse, i.e., four microseconds in the foregoing example, to maintain the constant velocity. This differential value, however, will change in response to the normal load encountered by the motor.

Also, the displacement interval can be varied by selecting emitter signals that occur at different resolutions. For example, emitter pulses could occur at quarter degree intervals or at intervals of two, five or ten degrees, etc.

The servo circuit described above for the constant velocity portion of a motor's speed profile, permits the unloading of a microprocessor during that servo period. This enables the microprocessor to be used for other tasks. The servo circuit also enables the application of full torque capability for the motor.

While the novel features of the present invention have been shown and described with reference to a preferred embodiment thereof, it will be understood by those skilled in the art, that changes can be made in the form and details without departing from the spirit and scope of the invention.

What is claimed is:

1. Velocity control apparatus for a direct current motor producing a displacement signal for each predetermined increment of shaft motion comprising:
   a source of clocking signals;
   first timing means connected to said clocking signal source and activated by each said displacement signal for generating a first output signal after a predetermined time interval less than the interval desired between successive ones of said displacement signals;
   second timing means connected to said clocking signals and activated by each said displacement signal for generating a second output signal after a predetermined time interval equal to the desired interval between successive ones of said displacement signals; and
   means responsive to the occurrence of said first output signal in the absence of said second output signal for supplying drive current to said motor.

2. Apparatus as described in claim 1 wherein said first timing means is activated by the leading edge of a said displacement signal and said second timing means is activated by the trailing edge of the same displacement signal.

3. Apparatus as described in claim 1 further comprising first supplemental means responsive to the occurrence of said second output signal during the absence of said first output signal for supplying drive current to said motor during the interval timed by said first timing means.

4. Apparatus as described in claim 1 further comprising second supplemental means responsive to the occurrence of said displacement signal in the absence of said first output signal for blocking said drive current to said motor.

5. Apparatus as described in claim 1 wherein said first and second timing means are settable to time intervals of varying duration.

6. Apparatus as described in claim 1 wherein said clocking signals occur at constant frequency.

7. Apparatus as described in claim 4 further including means responsive to said first output signal for resetting said first supplemental means.

8. Apparatus as described in claim 3 further including means responsive to said first output signal for disabling said second supplemental means.

9. Apparatus as described in claim 1 further comprising first supplemental means responsive to the occurrence of said second output signal during the absence of said first output signal for supplying drive current to said motor.

10. Apparatus as described in claim 1 wherein said means for supplying drive current is disabled when said first timing means is activated by said displacement signal.

11. Apparatus as described in claim 1 wherein said first and second timing means are resettable by said displacement signal to time a new respective interval before the expiration of the interval currently being timed.

12. Velocity control apparatus for direct current motor producing a displacement signal for each predetermined increment of shaft motion comprising:
   a source of constant frequency clocking signals;
   first retriggerable timing means connected to said clocking signal source and activated by each said displacement signal for generating a first output signal after a predetermined time interval less than the interval desired between successive ones of said displacement signals;
   second retriggerable timing means connected to said clocking signals and activated by each said displacement signal for generating a second output signal after a predetermined time interval equal to the desired interval between successive ones of said displacement signals; and
   means responsive to the occurrence of said first output signal in the absence of said second output signal for supplying drive current to said motor until said first timing means is activated by the next said displacement signal.

13. Apparatus as described in claim 12 wherein said first timing means is activated by the leading edge of a said displacement signal and said second timing means is activated by the trailing edge of the same displacement signal.

14. Apparatus as described in claim 12 further comprising first supplemental means responsive to the occurrence of said second output signal during the absence of said first output signal for supplying drive current to said motor during the interval timed by said first timing means.

15. Apparatus as described in claim 12 further including means for gating said second output signal to activate said first supplemental means.

16. Velocity control apparatus for a direct current motor producing a displacement signal for each predetermined increment of motion comprising:
   a source of clocking signals;
   first timing means connected to said clocking signal source and activated by each said displacement signal for generating a first output signal after a predetermined time interval less than the interval desired between successive ones of said displacement signals;
   second timing means connected to said clocking signal source and activated by each said displacement signal for generating a second output signal after a predetermined time interval equal to the desired interval between successive ones of said displacement signals; and
   means responsive to the relative occurrence of said first and second output signals for controlling the supply of drive current to said motor.

* * * * *